United States Patent [19]
Ushiro

[11] Patent Number: 4,710,011
[45] Date of Patent: Dec. 1, 1987

[54] AUTOMATIC RANGE FINDING DEVICE

[75] Inventor: Seimei Ushiro, Tokyo, Japan

[73] Assignee: Fuji Photo Film Co., Ltd., Kanagawa, Japan

[21] Appl. No.: 917,190

[22] Filed: Oct. 9, 1986

[30] Foreign Application Priority Data

Oct. 9, 1985 [JP] Japan ............................ 60-154467[U]

[51] Int. Cl.⁴ ................................................ G03B 3/10
[52] U.S. Cl. ..................................................... 354/403
[58] Field of Search ......................................... 354/403

[56] References Cited

U.S. PATENT DOCUMENTS 4,487,495 12/1984 Kimata et al. ...................... 354/403
4,575,211 3/1986 Matsumura et al. ................ 354/403

Primary Examiner—Michael L. Gellner
Attorney, Agent, or Firm—Young & Thompson

[57] ABSTRACT

An automatic range finding device has a light-emitting unit for emitting a slit of light as a beam toward a subject and a light-receiving unit for receiving light reflected from the subject, thereby to detect the subject distance based on the incident position of the reflected light received by the light-receiving unit. The light-emitting unit emits the slit of light slantwise relative to the image plane.

7 Claims, 9 Drawing Figures

AUTOMATIC RANGE FINDING DEVICE

BACKGROUND OF THE INVENTION

The present invention relates to an automatic range finding device for use with a camera such as an automatic focussing camera.

Most of the recent compact cameras are equipped with an automatic focussing mechanism by which the subject distance is measured when the release button is depressed and thereafter the taking lens is moved to a focussing position prior to actuation of the shutter. An automatic focussing mechanism is comprised by an automatic range finding device for measuring the subject distance and a lens drive mechanism for adjusting the position of the taking lens responsive to a distance signal from the automatic range finding device.

Varius types of such automatic range finding devices are known, among which an active type automatic range finding device is widely used because of its simplicity of signal processing. With the active type automatic range finding device, a light-emitting unit and a light-receiving unit are disposed on the front face of the camera body, both units being separated by a predetermined base length. A near-infrared light of a spot shape is emitted toward the subject from the light-emitting unit, reflected by the subject and received by the light-receiving unit. The subject distance is measured from the incident position of the near-infrared light received by the light-receiving unit.

A conventional active type automatic range finding device emits a small size spot of light near the center of the scene to be photographed. Therefore, in case the main subject is not located at the center of the image plane, e.g., if two persons stand side by side spaced apart by some distance, the spot of light passes between the two so that the correct distance to them cannot be measured. In such a case, since the taking lens is focussed at an infinite distance, the main subject, i.e., the two persons, are out-of-focus (this phenomenon is hereinafter referred to as "between-the-subject focussing").

To obviate this "between-the-subject focussing", an automatic range finding device incorporating wide range finding has been proposed which is disclosed in Japanese Patent Laid-open Publication No. 59-12809 for example. With this automatic range finding device, the light-emitting and receiving units are disposed on upper and lower portions of the front side of the camera body. If the camera is used in a horizontal position, the slit-type light beam is emitted in a horizontally elongated shape to the middle of the scene so as to place it at the middle of the image plane, or in other words elongated parallel to the ground. There is no problem in the case of a photography scene wherein several persons stand side by side, as frequently occurs. However, if the camera is used in a vertical position, the slit-type light beam is emitted vertically elongated relative to the ground. Therefore, as in the case of the active type automatic range finding device, a correct range finding is not possible unless the subject is located at the middle of the image plane.

Apart from the above problem associated with automatic range finding devices of this type, another problem has been encountered: if there are more than two subjects having a different subject distance, the automatic range finding device picks up only the signal representative of the nearer subject and correspondingly adjusts the position of the taking lens. Therefore, if there is a subject such as trees nearer than the main subject such as persons to be photographed, the taking lens is adjusted so as to focus on the nearer subject.

SUMMARY OF THE INVENTION

It is an object of the present invention to provide an automatic range finding device capable of attaining a correct range finding irrespective of the camera holding position, either in a horizontal position or in a vertical position.

To achieve the above object of the present invention, a light-emitting unit and light-receiving unit are obliquely disposed on the camera body so that a slit-type light beam emitted from the light-emitting unit is directed in the direction of a diagonal line on the image plane. The light source of the light-emitting unit may use a light-emitting diode, a flash lamp or the like which radiates near-infrared light.

BREIF DESCRIPTION OF THE DRAWINGS

DETAILED DESCRIPTION OF THE INVENTION

Figure 1:
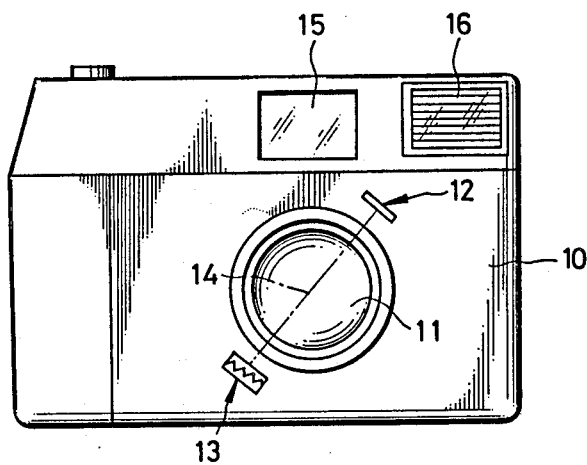
FIG. 1 is a front view of an automatic focussing camera to which an embodiment of the present invention is applied.

FIG. 1 shows an automatic focussing camera embodying the present invention. On the front center portion of a camera body 10, a taking lens 11 is mounted which is moved to focus in the direction of its optical axis by the amount required by the subject distance. A light-emitting unit 12 and a light-receiving unit 13 sandwich between them the taking lens 11. The light-emitting unit 12 emits a slit-type near-infrared light toward a subject, the near-infrared light extending in the direction perpendicular to a base line 14. The near-infrared light reflected by the subject is received by the light-receiving unit 13. In this embodiment of the invention, to enable range finding even when the camera is used in a vertical position, the light-emitting unit 12 is disposed slantwise relative to the camera body 10 to emit toward the subject a slit-type light beam which is disposed slantwise relative to the subject. Reference numeral 15 denotes a finder, and reference numeral 16 denotes a flash lamp unit.

Figure 2:
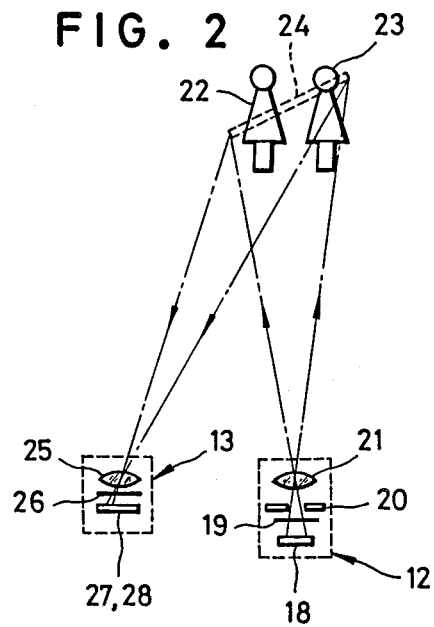
FIG. 2 shows the optical paths of an optical system of the embodiment shown in FIG. 1.

FIG. 2 shows the optical system of the automatic range finder of the present invention. The light-emitting unit 12 is comprised by a rod-like light source, e.g., a flash lamp 18, a filter passing only near-infrared light emitted from the flash lamp, an elongated slit 20, and a lens 21. The light-emitting unit emits a slit-type light beam to subjects 22 and 23. The light-receiving unit 12 is comprised by a lens 25, a filter 26 passing near-infrared light, and light-receiving sensors 27 and 28 (refer to FIG. 3).

The light-emitting unit 12 emits a slanted slit of light 24 toward the subjects, e.g., persons 22 and 23 so that these subjects can be irradiated by the slit of light even if the subjects do not stand at the middle of the image plane. The light-receiving unit 13 is made elongated in correspondence with the slit of light 24 so as to receive the reflected light. Therefore, there is no problem of "between-the-subject focussing" even when one main subject is not prsent at the middle of the image plane, contrary to the case of a conventional range finding device emitting a spot of light.

Figure 4:
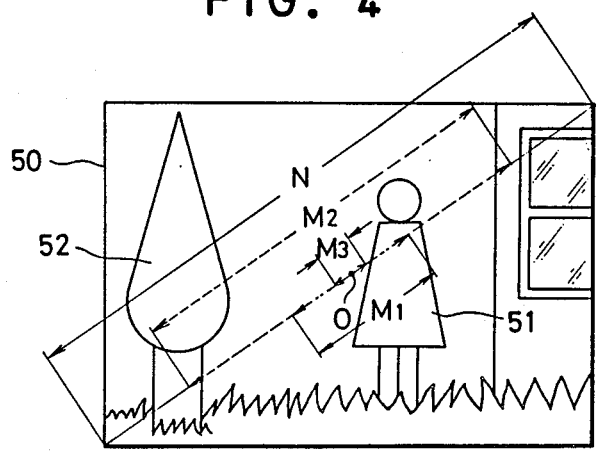
FIG. 4 shows an example of an image plane for illustrating a range finding width.

FIG. 4 shows an example of a subject pattern on an effective image plane 50. A slit of light is directed parallel to a diagonal of the image plane 50. The rangefinding width M1 determined by the light-receiving angle of the light-receiving element has about a ratio of 1/4.5 relative to the width N of the effective image plane. If the range-finding width M1 is set at such a value, a main subject 51 as desired to be photographed can be seized at a fairly good probability even if it is positioned apart from the screen center O of the image plane 50. In addition, a near subject 52 which it is not desired to photograph within the image plane 50 can be omitted from the range finding. In particular, as exemplarily shown in FIG. 4, the probability that a near subject 52 becomes an object for range finding, is high if a second range-finding width M2 wider than the width M1 is used, so that focussing of the main subject 51 becomes poor. In case of a narrower third range finding width M3, the main subject 51 may be missed even though it is positioned only slightly away from the image plane center O. A preferred ratio between the range-finding width M and the effect image plane width N will be later described.

Figure 3:
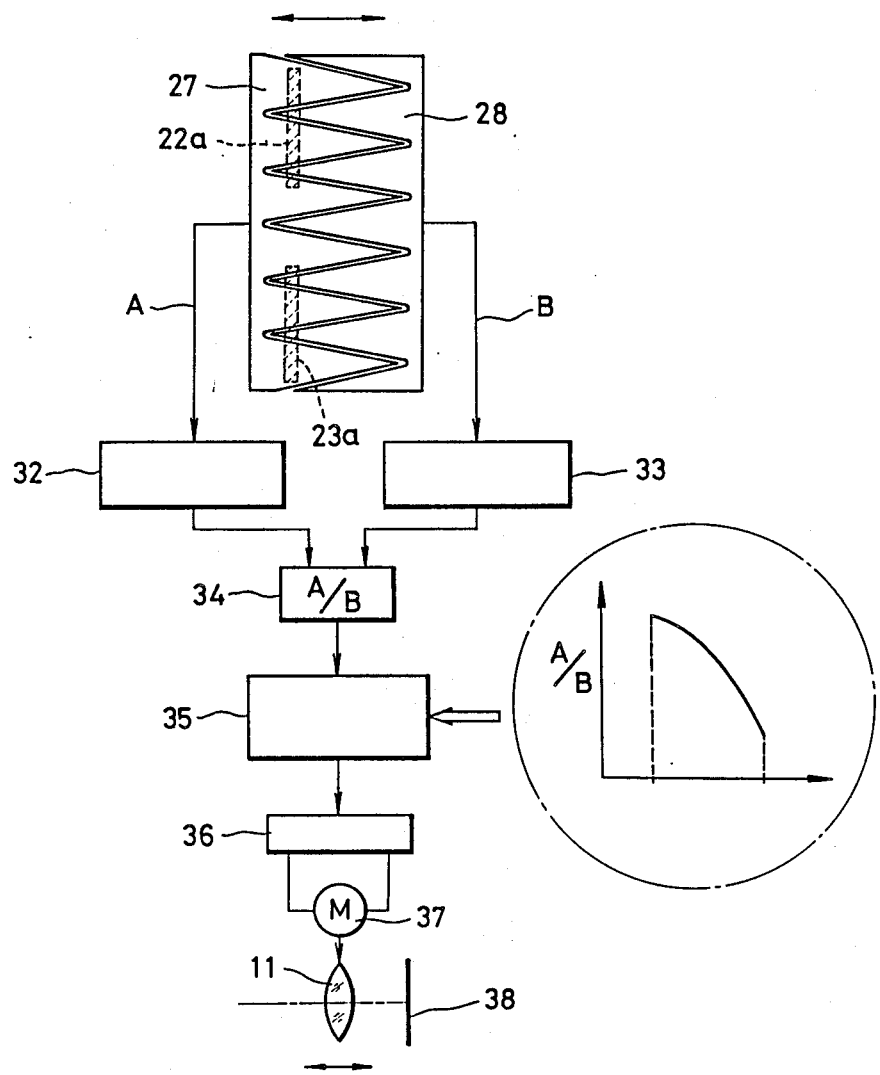
FIG. 3 is a block diagram showing the electric circuit of the embodiment of FIG. 1.

Referring to FIG. 3, two light-receiving sensors 27 and 28 are formed in a sawtooth shape with their light-receiving surfaces progressively changing in a horizontal direction, whereby the received position of the reflected light can be detected. Since the light-receiving sensors 27 and 28 have light-receiving areas that interfinger with each other, the output signal properties characteristic of subject distance are opposite to each other. Thus, if the subject is at a short distance, the reflected light falls on the left side of the sensor. Conversely, if the subject is at a greater distance, the reflected light falls on the right side. The light-receiving sensor 27 has a greater total area at the shorter distance to produce a large photocurrent, while the light-receiving sensor 28 has a greater total area at the greater distance to produce a large photocurrent. Therefore, even a slight displacement of the incident position of the reflected light causes a large difference between the photocurrents from the light-receiving sensors 27 and 28 having opposite output properties, thus ensuring a high precision of range finding.

In a scene wherein two persons stand separately at a short distance from each other, as shown in FIG. 2, near-infrared light reflected by the two persons 22 and 23 is applied to the light receiving sensors 27 and 28 in a "between-the-subject focussing" state as shown by oblique lines 22a and 23a in FIG. 3. Since the light-receiving sensor 27 has a wider light-receiving area and the light-receiving sensor 28 has a narrower light-receiving area, respectively, at a short distance, a photocurrent A outputted from the former sensor has a larger value than the photocurrent B outputted from the latter sensor.

Photocurrents A and B outputted from the lightreceiving sensors 27 and 28 are converted into voltage in voltage converters 32 and 33 and thereafter sent to an operator circuit 34 where a value A/B is obtained. An output of the operator circuit 34 is sent to a distance signal generator 35 and converted into a distance signal which is inputted to a driver 36. The driver 36 controls the amount of rotation of a motor 37 to move the taking lens 11 along its optical axis and set the lens 11 at a focussing position whereat a sharp image can be taken on a film 38.

If a building or the like is positioned between and behind the persons 22 and 23, the light reflected by the background is applied to the light-receiving sensors 27 and 28 on their greater distance side. This light reflected by the background raises the photocurrent of the light-receiving sensor 28. However, since the light reflected by a subject at a greater distance is considerably weaker than that at a short distance, range finding is not affected at all. Thus, in the case wherein a plurality of subjects are positioned at different distances, the subject at the shortest distance has priority over the other subjects and the taking lens 11 is moved to a focussing position appropriate to the nearest subject.

Figure 5:
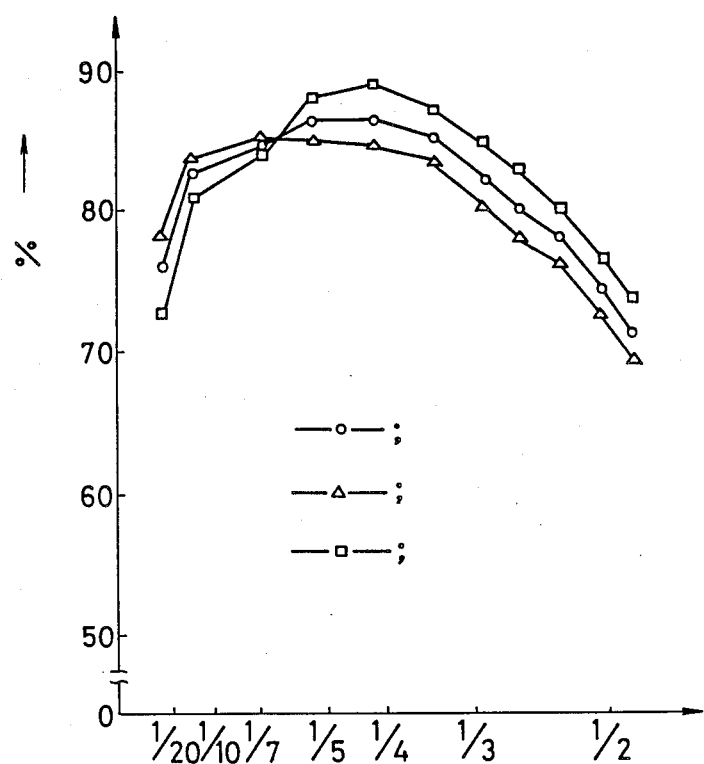
FIG. 5 is a graph showing a probability C relative to a range finding width ratio.

It will next be described how the range-finding width of a slit of light is determined. FIG. 5 shows the results of a study of what value of the range finding width W1 is appropriate, using about 1000 negative films actually photographed by ordinary amateurs. Probability in percent on the ordinate means that a main subject 51 will be within the range finding width M while a nearer subject 52 will be outside the range-finding width M. The range-finding width ratio S on the abscissa is the ratio between the diagonal length N of the effective image plane 50 and the range-finding width M, the values of the ratio used including 10 values: 1/20.0, 1/10.0, 1/6.8, 1/5.0, 1/4.1, 1/3.4, 1/2.9, 1/2.5, 1/2.0, and 1/1.8. Since the subject patterns photographed may have seasonal variations, the patterns used are 630 for those photographed in spring, and 390 to those photographed in summer.

As will be understood from this graph, although a slight variation can be recognized according to the season, the value of the range-finding width ratio which attains the maximum probability can be seen to be 1/5.0 to 1/4.0 which ensures a probability of more than 85% according to the total data. A conventional spot of light range finder uses a range-finding width ratio of about 1/20 which attains a probability of about 75% according to total data. If the effective width of a slit of light incident to the light-receiving element is made broader up to a range-finding width ratio of ½, then a probability increases of including both the main subject 51 and the nearer subject 52 within the range finding and the probability falls to about 70%.

In view of this analysis of the data, it will be seen to be most preferable to use the value of range-finding width ratio of about 1/4.5. Even in the range of about 1/10 to 1/2.5, it can be seen that the probability of correctly measuring the distance of the main subject 51, without being adversely affected by the nearer subject 52, is more than 80%.

To set the range-finding width S properly, the range-finding width M1 shown in FIG. 4 is adjusted relative to the effective image plane width N (which of course is a constant value) of the negative film used in the camera. To this end, the light-receiving angle of the light-receiving unit 13 may be adjusted as described previously, or the incident angle of a slit of light or spot of light radiated from the light-emitting unit 12 may be adjusted.

Figure 6:
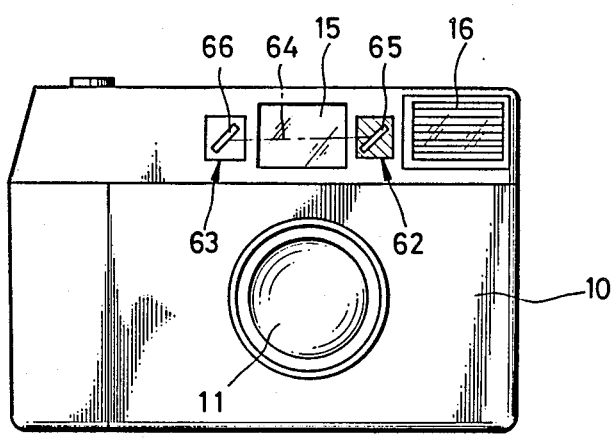
FIG. 6 is a front view of an automatic focussing camera to which another embodiment of the present invention is applied to obtain a slit-type light beam slanted relative to the image plane.

FIG. 6 shows another embodiment of the present invention, wherein a slit-type light beam is emitted slant-wise relative to the image plane. In this embodiment, although the base line passing through the light-emitting unit 62 and the light-receiving unit 63 is horizontal, the slit 65 is disposed slantwise. The slit-type light beam having a desired width is produced by means of an optical system (not shown) such as a cylindrical lens. The light-receiving element of the light receiving unit 63 is also disposed parallel to the slit 65. In the figure, elements identical to those in FIG. 1 bear the same reference numerals.

Figure 7:
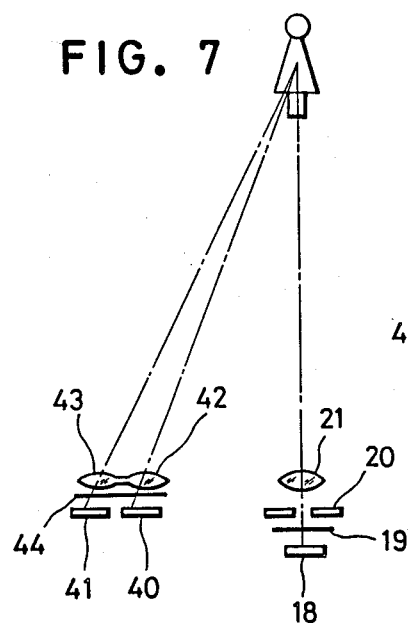
FIG. 7 illustrates an optical system using two light-receiving sensors according to another embodiment of the present invention.

FIG. 7 shows an embodiment using two light-receiving sensors, wherein elements identical to those in FIG. 2 bear the same reference numerals. In this embodiment, the light-receiving sensors 40 and 41 are disposed separately in the direction perpendicular to the base line 14 (refer to FIG. 1). Lenses 42 and 43 are disposed in front of the light-receiving sensors 40 and 41. Reference numeral 44 denotes a filter passing near-infrared light.

Figure 8:
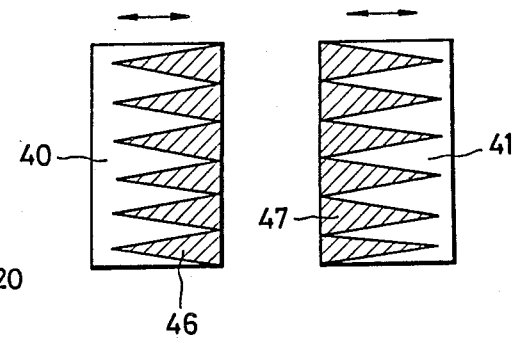
FIG. 8 is a plan view showing the light-receiving sensors of FIG. 7.

FIG. 8 shows the light-receiving sensors of FIG. 7. On one side of each of the light-receiving sensors 40 and 41, light-shielding masks 46 and 47 of a sawtooth shape are provided. The light-shielding masks 46 and 47 are arranged opposite to each other so as to provide reversed output properties of the light-receiving sensors 40 and 41.

Figure 9:
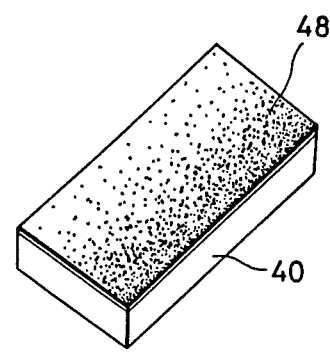
FIG. 9 is a perspective view showing another embodiment of a light-receiving sensor.

FIG. 9 shows another embodiment of a light-receiving sensor. In this embodiment, in front of a light-receiving sensor 40 a filter 48 (optical wedge) having a concentration gradient is disposed to generate a photocurrent corresponding in amount to the incident position.

In the sawtooth-shaped embodiment, the pitch between each sawtooth is uniform. However, to weight the measurement near the center of the image plane, the pitch near the center of the light-receiving sensor may be made coarse, or the sawtooth may be thinned out, or the width of a slit of light may be broader near the center thereof as compared with that of end portions. As a light-receiving sensor, a plurality of laterally elongated light-receiving units as disclosed in Japanese Patent Laid-open Publication No. 59-12809 may be used by disposing them in the vertical direction one upon another, or an area image sensor such as a CCD may be used.

According to the present invention as set forth above, a light-emitting unit for emitting a wide slit-type light beam and a light-receiving unit having a wide light-receiving surface are used, the range finding ability is quite broad, and the light-emitting and -receiving units are disposed slantwise on the camera body. Therefore, the subject distance can be correctly measured irrespective of whether the camera is used in a horizontal position or in a vertical position.

Furthermore, since the ratio of the range-finding width M relative to the effective image-plane width N is set from 1/10 to 1/2.5, the probability becomes high of using the main subject for range finding rather than a nearer subject such as trees. Thus, a photograph in which the main subject is sharply focussed can be taken without prefocussing.

What is claimed is:

1. In an automatic range finding device comprising a light-emitting unit and a light-receiving unit disposed on the front face of a camera body, said units being spaced apart at opposite ends of an imaginary base line of prdetermined lengths, means for emitting a slit of light in the form of a beam having a predetermined width toward a subject to be photographed, the light from said beam reflected from said subject being received by said light-receiving unit to measure the subject distance based on the incident position of the received reflected light; the improvement in which: said light-emitting unit and said light-receiving unit are so disposed that said beam is disposed slantwise relative to an image plane of the camera, whereby the subject distance can be correctly measured irrespective of whether the camera is used in a horizontal position or in a vertical position.

2. An automatic range finding device according to claim 1, wherein said base line is disposed slantwise relative to said camera body.

3. An automatic range finding device according to claim 1, said reflected light received by said light-receiving unit having a width about 1/10 to 1/2.5 the width of said image plane, and said reflected light being located near the middle of a diagonal line of said image plane.

4. An automatic range finding device according to claim 1, wherein said light-emitting unit comprises a light source, a slit, and a lens for emitting light from said light source that has passed through said slit.

5. An automatic range finding device according to claim 4, wherein said slit is disposed slantwise relative to the camera.

6. An automatic range finding device according to claim 5, wherein said base line is horizontal when the camera body is held horizontal.

7. An automatic range finding device according to claim 5, wherein said base line is disposed slantwise relative to said camera body.

* * * * *